US007764636B2

(12) United States Patent
Tsunasawa et al.

(10) Patent No.: US 7,764,636 B2
(45) Date of Patent: Jul. 27, 2010

(54) CONTENT DISTRIBUTING SYSTEM AND CONTENT DISTRIBUTING METHOD

(75) Inventors: Junko Tsunasawa, Kanagawa (JP); Kei Okamoto, Kanagawa (JP); Kunihiko Gotoda, Kanagawa (JP); Kazumi Endo, Tokyo (JP); Osamu Kato, Kanagawa (JP); Akihiro Oyama, Hyogo (JP)

(73) Assignee: Panasonic Corporation, Kadoma-shi (JP)

( * ) Notice: Subject to any disclaimer, the term of this patent is extended or adjusted under 35 U.S.C. 154(b) by 511 days.

(21) Appl. No.: 11/578,356

(22) PCT Filed: Mar. 31, 2005

(86) PCT No.: PCT/JP2005/006256
§ 371 (c)(1),
(2), (4) Date: Nov. 3, 2006

(87) PCT Pub. No.: WO2005/101699
PCT Pub. Date: Oct. 27, 2005

(65) Prior Publication Data
US 2008/0019296 A1      Jan. 24, 2008

(30) Foreign Application Priority Data
Apr. 13, 2004    (JP) .............................. 2004-118285

(51) Int. Cl.
*H04H 20/71*      (2008.01)
(52) U.S. Cl. ................. 370/312; 370/347; 370/216; 370/229; 370/260; 370/254; 370/432; 370/390; 370/252; 455/419; 709/223
(58) Field of Classification Search ............... 709/203, 709/231; 455/312, 422.1, 436, 442; 370/349, 370/432, 312, 390, 331, 231, 260, 229, 216, 370/254, 224
See application file for complete search history.

(56) References Cited

U.S. PATENT DOCUMENTS 5,748,980 A * 5/1998 Lipe et al. ..................... 710/8
6,507,562 B1 * 1/2003 Kadansky et al. .......... 370/216

(Continued)

FOREIGN PATENT DOCUMENTS

JP          2001306435         11/2001

(Continued)

OTHER PUBLICATIONS

PCT International Search Report dated Jul. 26, 2005.

*Primary Examiner*—Rafael Pérez-Gutiérrez
*Assistant Examiner*—Joseph Arevalo
(74) *Attorney, Agent, or Firm*—Christensen O'Connor Johnson Kindness PLLC (57) ABSTRACT

A content distributing system wherein the reliability of receiving content data in wireless sections is improved to realize a more reliable content data distribution. When performing a data download communication (e.g., MBMS communication mode) using a multicast, a distribution managing apparatus (102) produces and broadcasts an MBMS communication mode initiation instructing signal to each of mobile terminal apparatuses (104). In response to the MBMS communication mode initiation instructing signal, the mobile terminal apparatus (104) stops another currently running application program and initiates the MBMS communication mode. In this way, the mobile terminal apparatus (104) can use sufficient resources to execute a multicast data download communication mode, so that it can receive the broadcasted contents without fail.

7 Claims, 13 Drawing Sheets

U.S. PATENT DOCUMENTS

| | | |
|---|---|---|
| 6,526,022 B1 * | 2/2003 | Chiu et al. .................. 370/229 |
| 6,539,000 B1 * | 3/2003 | Murai et al. ................ 370/260 |
| 7,093,026 B2 | 8/2006 | Kokado et al. |
| 2002/0184372 A1 * | 12/2002 | Ishikawa et al. ............ 709/227 |
| 2003/0202501 A1 * | 10/2003 | Jang ........................... 370/346 |
| 2003/0224761 A1 | 12/2003 | Goto |
| 2005/0085182 A1 * | 4/2005 | Chuberre et al. ............ 455/3.01 |
| 2006/0085862 A1 * | 4/2006 | Witt et al. ..................... 726/26 |
| 2006/0218262 A1 * | 9/2006 | Abeta et al. ................. 709/223 |
| 2006/0268816 A1 * | 11/2006 | Adachi et al. ............... 370/347 |
| 2008/0025239 A1 * | 1/2008 | Bossoli et al. .............. 370/312 |

FOREIGN PATENT DOCUMENTS

| | | |
|---|---|---|
| JP | 2002094560 | 3/2002 |
| JP | 2002133302 | 5/2002 |
| JP | 2002305548 | 10/2002 |
| JP | 2003134566 | 5/2003 |
| JP | 2003186679 | 7/2003 |
| JP | 2003258950 | 9/2003 |
| JP | 2003304343 | 10/2003 |
| WO | WO 03071697 A1 * | 8/2003 |

* cited by examiner

CONTENT DISTRIBUTING SYSTEM AND CONTENT DISTRIBUTING METHOD

TECHNICAL FIELD

The present invention relates to technology for distributing information (content) stored on a server to mobile terminals by wireless.

BACKGROUND ART

Conventionally, in the workshops and classrooms etc., the distribution of desired content to mobile terminals of attendants and students etc. for example, by a request from the owner of a mobile terminal have been considered. In this event, simultaneous access has been made from mobile terminals, the likelihood of congestion is high and situations occur where the acquisition of information is delayed due to traffic overload of wireless zones or where the information cannot be acquired.

A method of communicating distribution information using multicasting (multicast to specified multiple destinations) have therefore been proposed (see, Patent Documents 1, 2 and 3) as a method of resolving this situation. According to this method, it is possible to distribute content simultaneously, for example, by instruction from an instructor so that it is possible to reduce the traffic between wireless zones.

With mobile telephone standards referred to as "third generation," some mobile telephones have introduced this multicast communication. Specifically, multicast/broadcast communication is carried out between wireless zones by using MBMS (Multimedia Broadcast/Multicast Service) and the traffic load between wireless zones is reduced. If this MBMS is used, it is possible to simultaneously distribute desired content during classes to mobile telephones of students.

Patent Document 1: Japanese Patent Application Laid-Open No. 2002-305548.
Patent Document 2: Japanese Patent Application Laid-Open No. 2002-94560.
Patent Document 3: Japanese Patent Application Laid-Open No. 2001-306435.

DISCLOSURE OF INVENTION

Problems to be Solved by the Invention

In the case of a 1 to N type communication scheme such as the multicast communication or multicast/broadcast communication described above, data is transferred without carrying out a handshake so that the reliability of data transfer particularly between wireless zones becomes low. Namely, there is the possibility of content not arriving at a mobile terminal though content has been distributed on the transmission side.

It is therefore an object of the present invention to provide a content distribution system and method capable of improving reliability for reception of content data between wireless zones and capable of reliably distributing content data.

Means for Solving the Problem

In order to resolve this problem, in the present invention, other running application programs at the mobile terminal apparatus are made to be stopped prior to carrying out data download communication (for example, MBMS communication mode) using multicasting. As a result, at the mobile terminal, a multicast data download communication mode can be executed using sufficient resources so that it is possible to reliably carry out processing for receiving content to be distributed. As a result, it is possible to reliably receive content notified through multicasting.

Further, in the present invention, mobile terminal apparatuses are notified through multicasting of a signal instructing starting up of communication mode in advance from the distribution side when the multicast data download communication mode is carried out. Accordingly, at communication terminals, it is possible to carry out processing for stopping the application program and carrying out the multicast data download communication mode automatically. As a result, it is possible to receive content transmitted using multicasting even more reliably and easily.

Advantageous Effect of the Invention

According to the present invention, it is possible to improve reliability for reception of signals between wireless zones and provide reliable distribution of content data in multicast downloads of content data.

BEST MODE FOR CARRYING OUT THE INVENTION

Embodiments of the present invention will now be described in detail with reference to the drawings.

Embodiment 1

Figure 1:
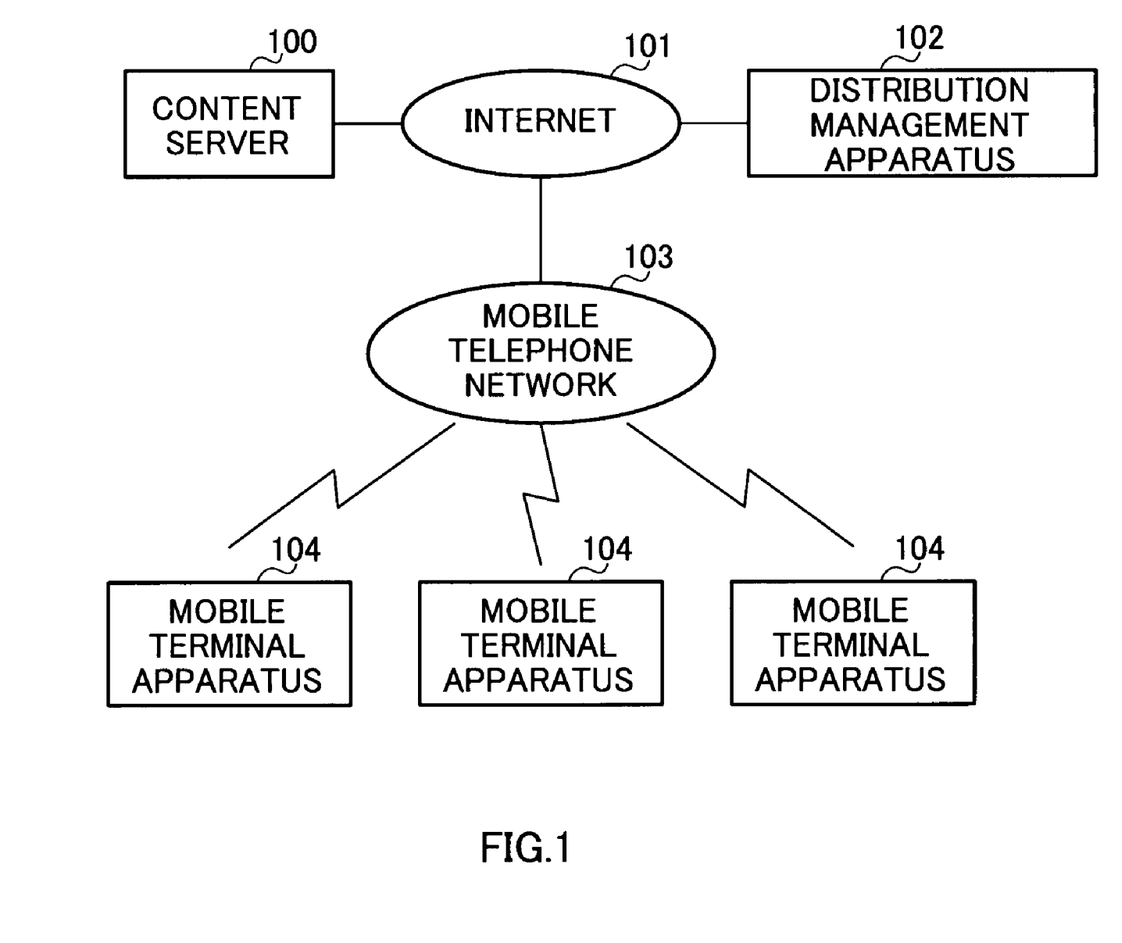
FIG. 1 shows an example configuration of a content distribution system using multicasting according to the embodiments of the present invention.

An overall configuration for a content distribution system of Embodiment 1 is shown in FIG. 1. In the content distribution system, content server 100, distribution management apparatus 102 and mobile telephone network 103 are connected to Internet 101. Further, a plurality of mobile terminal apparatuses 104 are connected and accessible to Internet 101 via mobile telephone network 103.

Here, mobile terminal apparatus 104 indicates a mobile telephone, personal computer, or PDA etc., that is, having a wireless communication function connectable with mobile telephone network 103 by wireless. Distribution management apparatus 102 is located, for example, on the desk of an instructor, carries out communication with mobile terminal apparatus 104 via Internet 101 and mobile telephone network 103, and for example, instructs the distribution of content to mobile terminal apparatus 104 of students and controls collections of response information etc. from mobile terminal apparatus of the students.

Figure 2:
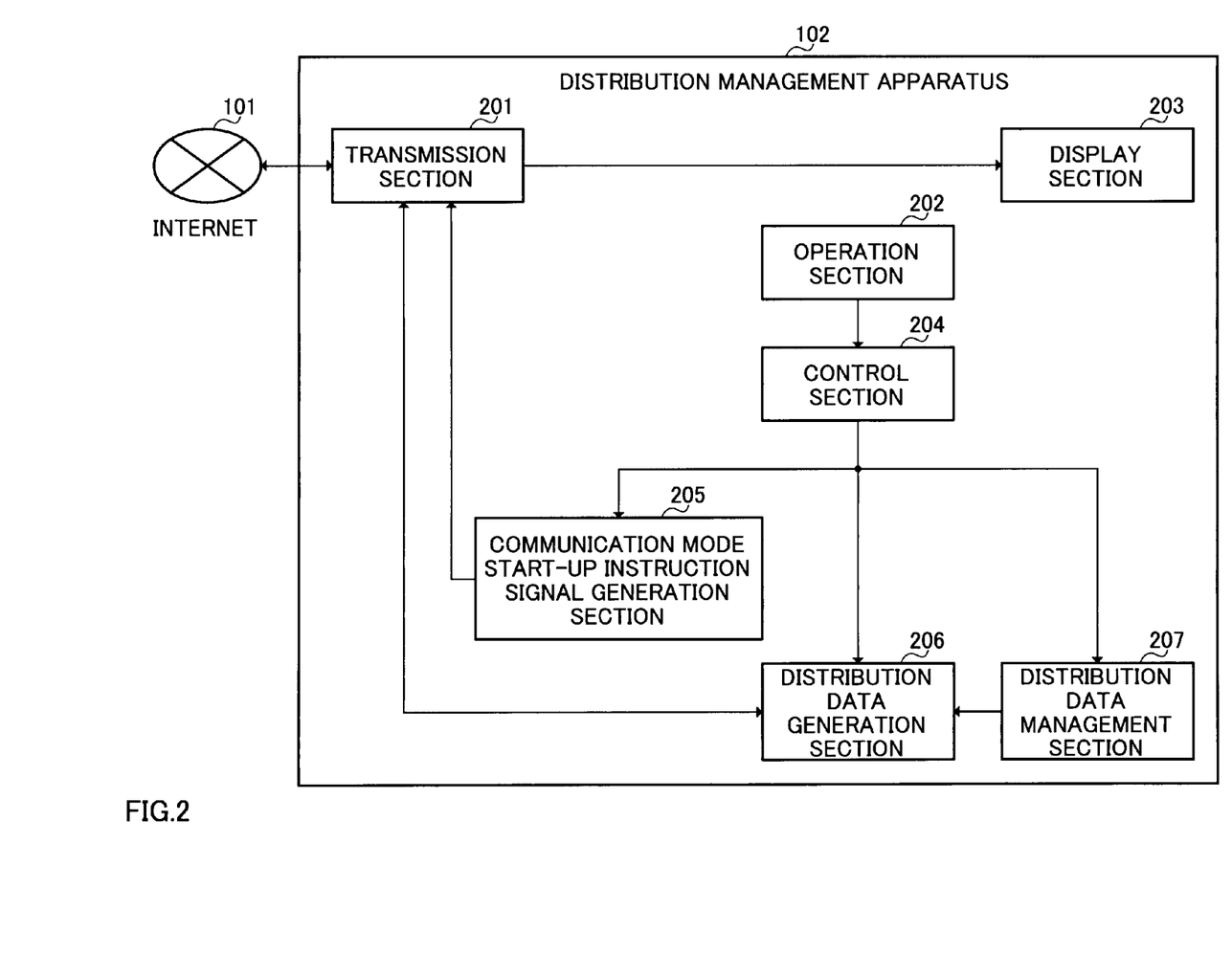
FIG. 2 is a block view showing a configuration of a content management apparatus of the embodiments.

A configuration of distribution management apparatus 102 is shown in FIG. 2. Distribution management apparatus 102 has transmission section 201 that carries out communication with Internet 101, operation section 202, and display section 203, and displays information taken in from Internet 101 via transmission section 201 at display section 203. Further, control signals formed by control section 204 according to the operation of operation section 202 are transmitted to communication mode start-up instruction signal generation section 205, distribution data generation section 206, and distribution data management section 207.

Communication mode start-up instruction signal generation section 205 generates an MBMS communication mode start-up instruction signal instructing to start up MBMS communication mode based on a control signal from control section 204 and transmits the signal to transmission section 201. Distribution data generation section 206 controls content server 100 connected to Internet 101, edits data to be distributed, and instructs for distribution. Distribution data management section 207 manages teaching material lists to be distributed and content server 100.

Upon having a distribution instruction for content from a user, rather than distributing content immediately, distribution management apparatus 102 distributes content after transmitting an instruction to start up MBMS communication mode to mobile terminal apparatuses 104. As a result, mobile terminal apparatuses 104 are capable of entering MBMS communication mode after making the necessary preparation for carrying out MBMS communication mode based on an MBMS communication mode start-up instruction signal.

Figure 3:
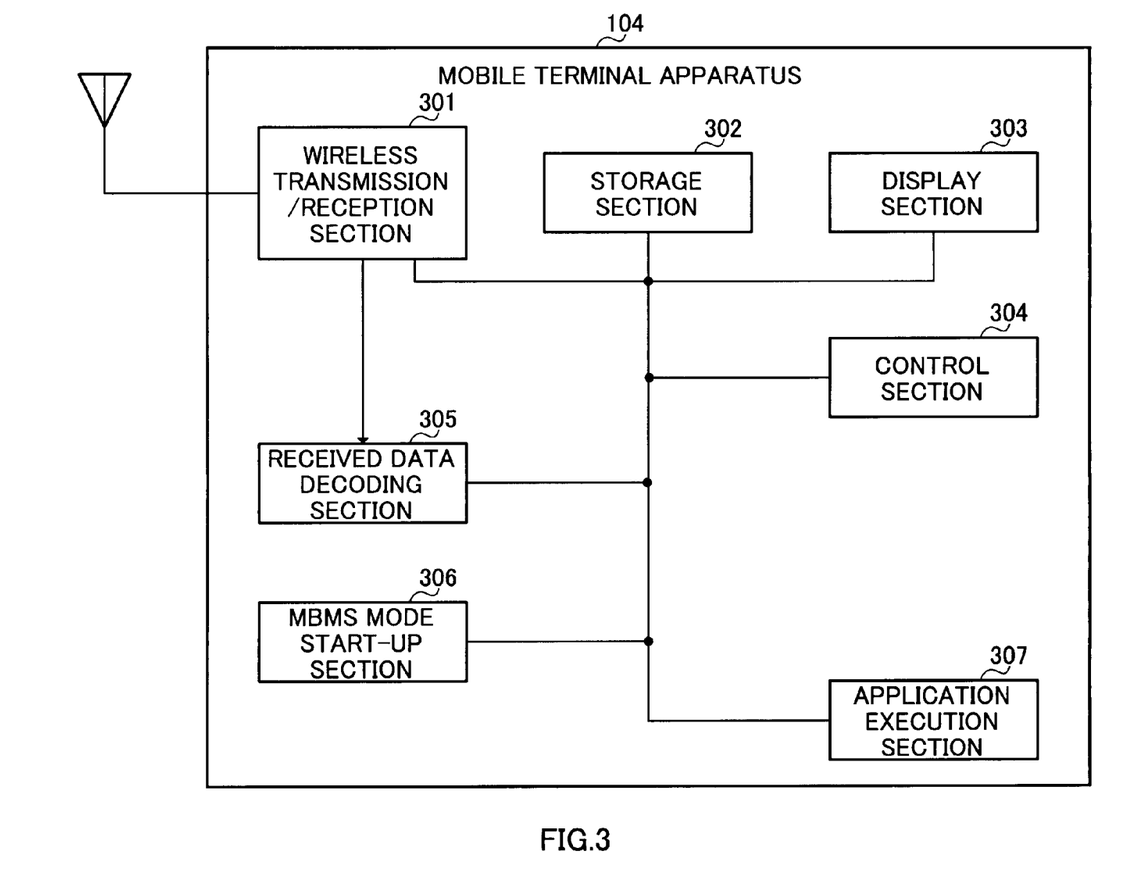
FIG. 3 is a block view showing a configuration of a mobile terminal apparatus of Embodiment 1.

A configuration of mobile terminal apparatus 104 is shown in FIG. 3. Mobile terminal apparatus 104 has wireless transmission/reception section 301 capable of transmitting and receiving data to and from Internet 101 via mobile telephone network 103, received data decoding section 305 that decodes data received by wireless transmission/reception section 301, storage section 302 that saves received data such as content, display section 303 that displays received content etc., control section 304 that controls overall apparatus operation, and application execution section 307 that executes each of the various applications in accordance with an application program.

In addition, mobile terminal apparatus 104 has MBMS mode start-up section 306. When mobile terminal apparatus 104 receives an MBMS communication mode start-up instruction signal from distribution management apparatus 102 and data indicating the reception of signals is obtained by received data decoding section 305, MBMS mode start-up section 306 switches the apparatus as a whole over to MBMS communication mode. In reality, an instruction for executing MBMS communication mode is given to control section 304 and application execution section 307. As a result, prior to distribution of content, application execution section 307 and control section 304 can be put into a state of executing MBMS communication at ease so that distributed content can be reliably received.

Figure 4:
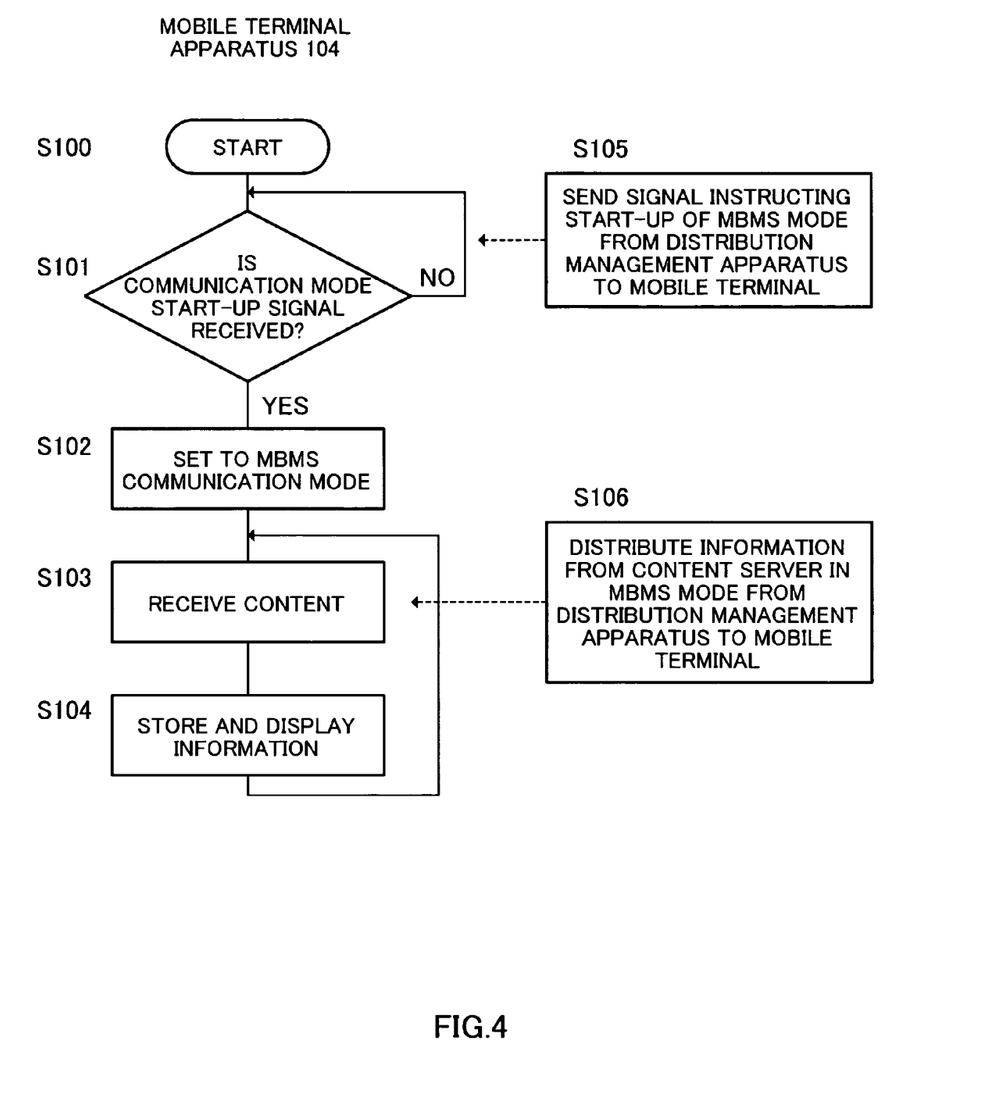
FIG. 4 is a flow chart illustrating the operation of a content distribution system of Embodiment 1.

Next, the operation of a content distribution system of this embodiment will be described using FIG. 4.

First, when an instructor would like to distribute data such as materials, problems, and messages etc. to the mobile telephones of attendants or students in a workshop or classroom etc. in advance, or operations are carried out by operation section 202 of distribution management apparatus 102 of an instructor, an MBMS communication mode start-up instruction signal for mobile terminal apparatus 104 is transmitted to Internet 101 via transmission section 201 by communication mode start-up instruction signal generation section 205 (S105).

This MBMS communication mode start-up instruction signal is also transmitted through multicasting to the mobile terminal apparatuses 104 carried by the students via Internet 101 and mobile telephone network 103. In the case of this embodiment, it is taken that the MBMS communication mode start-up instruction signal is transmitted continuously and re-transmitted rather than being transmitted one time, considering situations where reception is not possible at mobile terminal apparatus. Mobile terminal apparatus 104 then receives the MBMS communication mode start-up instruction signal from wireless transmission/reception section 301 (S101), and decodes the MBMS communication mode start-up instruction signal by received data decoding section 305. Upon recognizing the instruction to start-up MBMS communication mode, mobile terminal apparatus 104 sets itself to MBMS communication mode using MBMS mode start-up section 306 (S102).

Distribution management apparatus 102 then distributes information to mobile terminal apparatus 104 in MBMS communication mode using distribution data management section 207 and distribution data generation section 206 (S106). Upon receiving distribution information by wireless transmission/reception section 301, and carrying out reception processing for decoding the distribution information of content etc. by received data decoding section 305 (S103), mobile terminal apparatus 104 displays the distribution information at display section 303 by control section 304 and stores data in storage section 302 (S104).

According to this embodiment, by generating an MBMS communication mode start-up instruction signal on the distribution side, notifying mobile terminal apparatuses 104 of the signal via multicasting, and having mobile terminal apparatus 104 preparing for starting up MBMS communication mode and carrying out start-up based on this MBMS communication mode start-up instruction signal, it is possible to automatically switch over to communication mode by instruction from distribution management apparatus 102 without any operations on the side of mobile terminal apparatus 104 so that content can be downloaded by the instructors switching over of communication modes forcibly without students etc. operating mobile terminal apparatus 104 and setting communication mode, and the lectures can be proceeded efficiently.

Further, it is possible to have a period for preparation when mobile terminal apparatus 104 enters MBMS communication mode so that reliability during receiving of distributed data in MBMS communication mode is improved.

Embodiment 2

Figure 5:
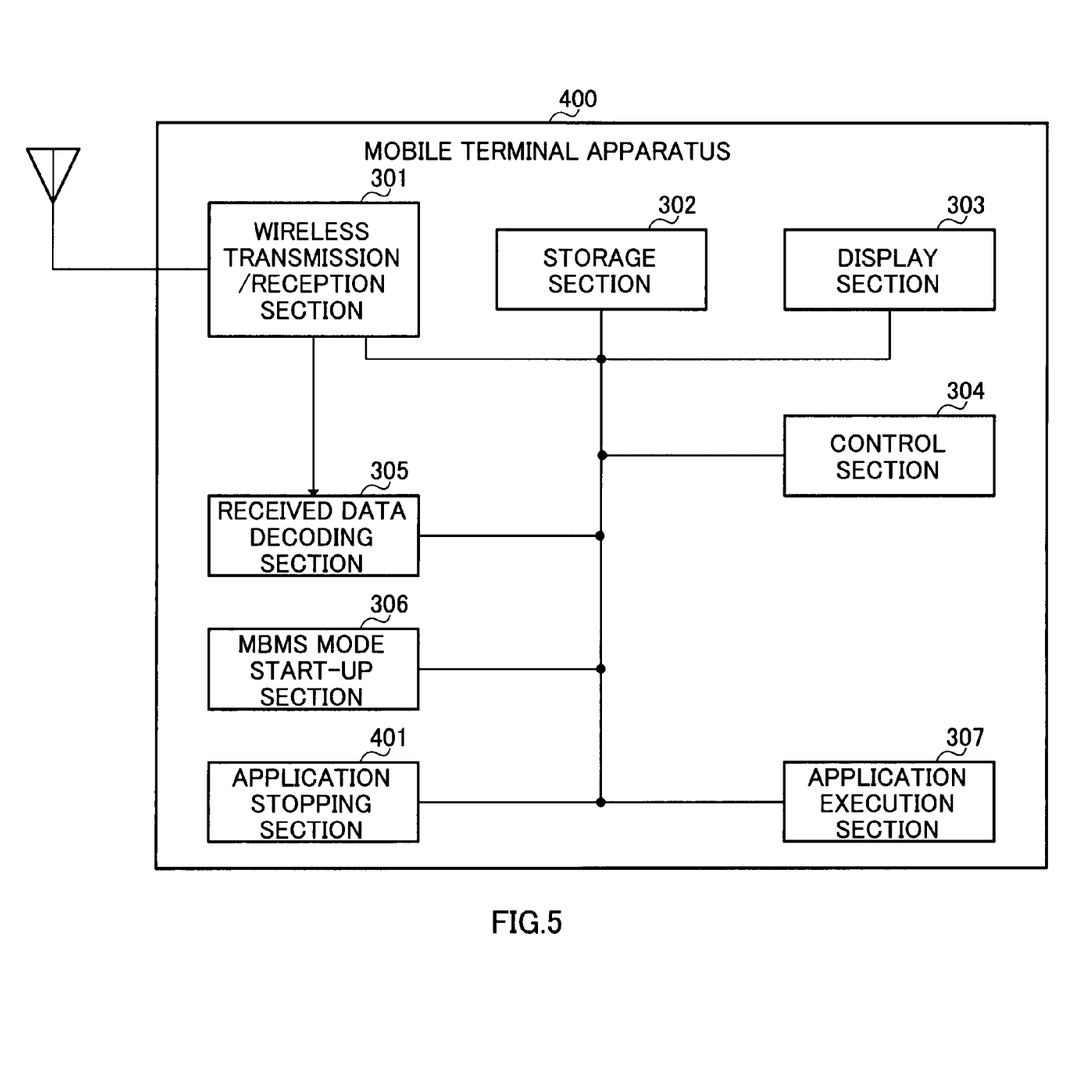
FIG. 5 is a block view showing a configuration of the mobile terminal apparatus of Embodiment 2.

A configuration of a mobile terminal apparatus of this embodiment is shown in FIG. 5, with components corresponding to FIG. 3 being assigned the same numerals. Mobile terminal apparatus 400 has the same configuration as mobile terminal apparatus 104 of FIG. 3 except for having application stopping section 401.

When mobile terminal apparatus 400 receives an MBMS communication mode start-up instruction signal from distribution management apparatus 102 and data indicating the reception of signal is obtained by received data decoding section 305, application stopping section 401 causes an application program currently running at application execution section 307 to stop.

At this time, in the case of this embodiment, a case is described where application stopping section 401 completely stops the application currently running, but as it is sufficient to ensure the resources necessary for executing MBMS communication mode, only a part of the running applications may be stopped with this into consideration.

Figure 6:
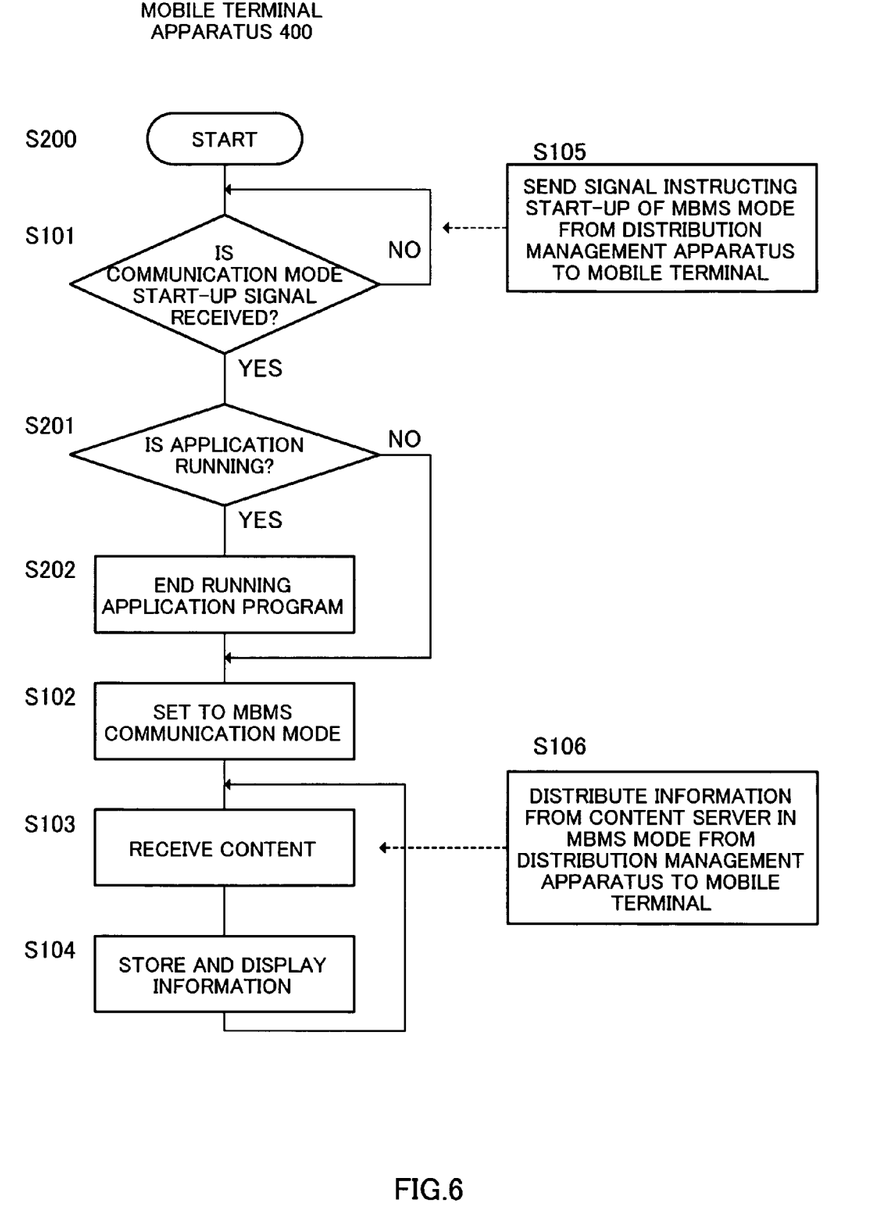
FIG. 6 is a flow chart illustrating the operation of a content distribution system of Embodiment 2.

Next, the operation of a content distribution system of this embodiment will be described using FIG. 6. In FIG. 6, the components corresponding to FIG. 4 are assigned the same numerals and description thereof will be omitted.

Mobile terminal apparatus 400 receives an MBMS communication mode start-up instruction signal from wireless transmission/reception section 301 (S101) When the MBMS communication mode start-up instruction signal is decoded by received data decoding section 305, application stopping section 401 detects whether or not another application program is running at application execution section 307 (S201). In the event that another application program is not running, the processing flow moves to step S102, and mobile terminal apparatus 400 itself is set to MBMS communication mode by MBMS mode start-up section 306. Meanwhile, in the event that another application is running, the processing flow moves to step S202, and the operation of the application program running at application execution section 307 is stopped by application stopping section 401.

In this way, other application programs are not running when MBMS communication mode is started up so that there are sufficient resources to execute MBMS communication mode. As a result, it is possible to reliably receive distribution data.

In the event that application program stop processing is carried out, the states of each application are held. As a result, after reception of distribution data is complete, the interrupted application programs can be promptly continued.

According to this embodiment, communication mode of mobile terminal apparatus 400 is able to be switched using an instruction (MBMS communication mode start-up instruction signal) from distribution management apparatus 102 without carrying out any operations on the side of mobile terminal apparatus 400, and, in addition, the operation of other application programs is stopped based on the MBMS communication mode start-up signal so that it is possible to lower the occupancy rate of other resources at the time of receiving distribution data, and improve reliability for the reception of distribution data in MBMS communication mode.

Embodiment 3

In this embodiment, it is proposed to carry out stop processing of application programs in stages based on time remaining to the start of distribution when stopping application programs being run based on MBMS communication mode start-up instruction signals as described in Embodiment 2.

In the case of this embodiment, a command of a different request level is generated according to the time until start of distribution by communication mode start-up instruction signal generation section 205 of distribution management apparatus 102 (FIG. 2) and is transmitted to mobile terminal apparatus. This command is added to the communication mode start-up instruction signal and transmitted. Different application program stopping processing is then carried out according to the request level indicated by the received command at the mobile terminal apparatus.

Figure 7:
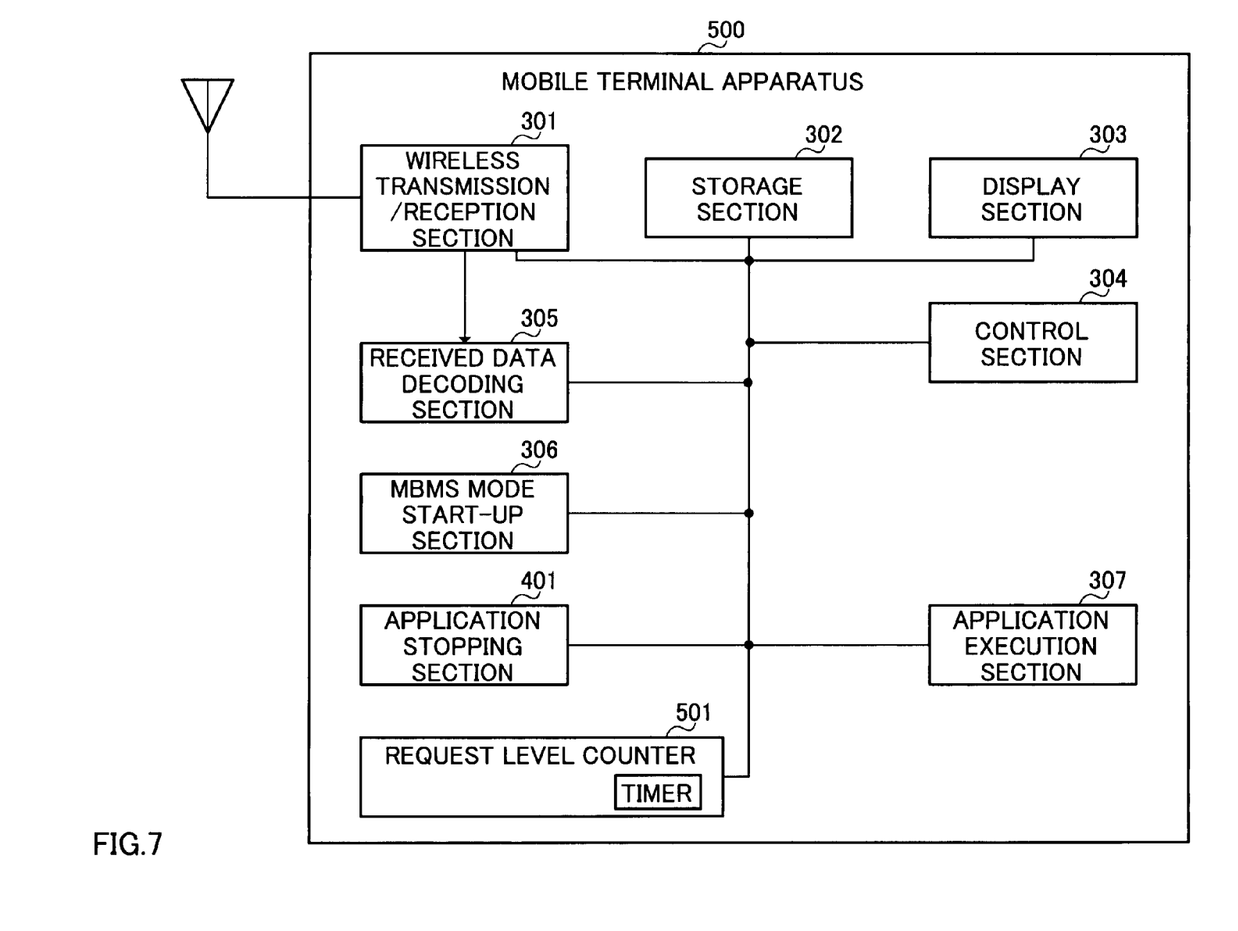
FIG. 7 is a block view showing the configuration of a mobile terminal apparatus of Embodiment 3.

A configuration of a mobile terminal apparatus of this embodiment is shown in FIG. 7, with components corresponding to FIG. 5 being assigned the same numerals. Mobile terminal apparatus 500 has the same configuration as mobile terminal apparatus 400 of FIG. 5 except for having request level counter 501.

Mobile terminal apparatus 500 then carries out a different application program ending processing according to the count value of request level counter 501. Specifically, processing for ending application programs more forcibly is carried out to the larger count values.

Request level counter 501 increases the counter value according to the added request level every time a communication mode start-up instruction signal is received. Request level counter 501 has a timer so that when a communication mode start-up instruction signal is initially inputted, the counter value is incremented every predetermined time (for example, every few minutes). As a result, even in wireless transmission environments where it is hard to receive a communication mode start-up signal, application program stop requests can be made higher as the timing of content distribution approaches. Further, if the communication mode start-up instruction signal is transmitted just one time, it is possible to sequentially move to a mode for forcibly stopping an application program automatically as content distribution timing approaches.

Figure 8:
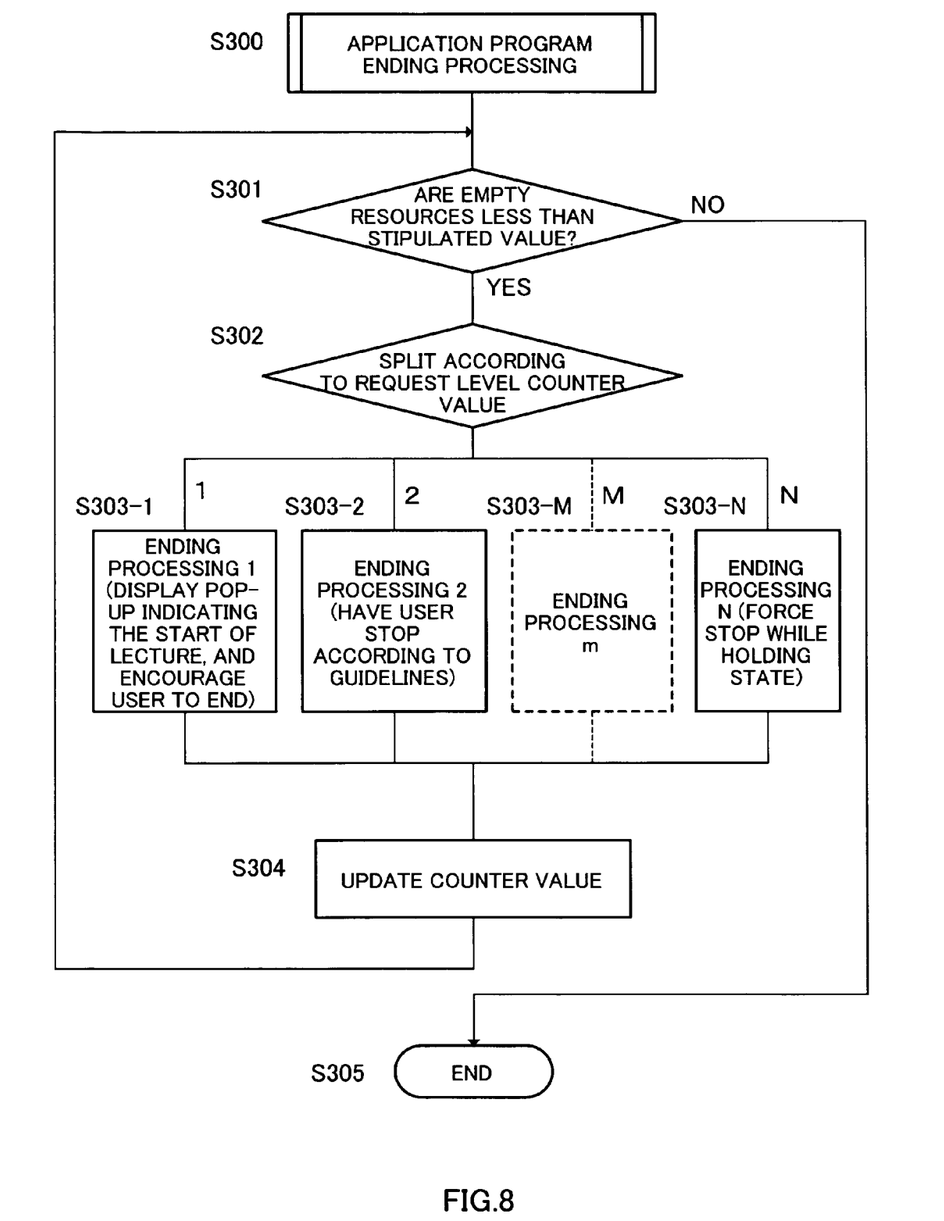
FIG. 8 is a flow chart illustrating an application ending processing of Embodiment 3.

An application program ending processing according to this embodiment is shown in FIG. 8. The processing of FIG. 8 is equivalent to the processing of step S202 of FIG. 6. Upon entering the application program finishing processing (S300), in step S301, mobile terminal apparatus 500 determines whether or not empty resources are less than a specified value, i.e. whether or not there are sufficient empty resources to execute MBMS communication mode. In the event that it is determined the empty resources are insufficient, the flow processing moves to step S302, the request level counter value is looked at, and any one of the processing of steps S303-1 to S303-N is moved to according to the counter value.

For example, when the request level is at the first stage, by a pop-up display indicating that the lecture is about to start, the user themselves is encouraged to end the operation of the application (S303-1). When the second stage is entered, a screen for confirming end of the running application is displayed, and the user causes the application to end in an order as given in guidance (S303-2). In the final stage, the necessary minimum state is maintained and the application is forcibly ended (S303-N). Here, 1 to N are counter values.

Proceeding to step S304, the counter value is updated (i.e. incremented). In reality, as described above, a new command is received, a communication mode start-up instruction signal with the updated request level is received, or the counter value is incremented every predetermined time.

After this, the flow processing returns to step S301, and in the event that the empty resources are less than the stipulated value, and the processing of steps S302, and S303-1 to S303-N is carried out based on the updated counter value. At this time, the counter value is larger than the previous time so that processing for ending the application more forcibly than the previous time of application ending processing is carried out. Namely, the counter value becomes larger as the distribution timing approaches, and application ending processing is carried out more forcibly as the counter values become large.

Figure 9:
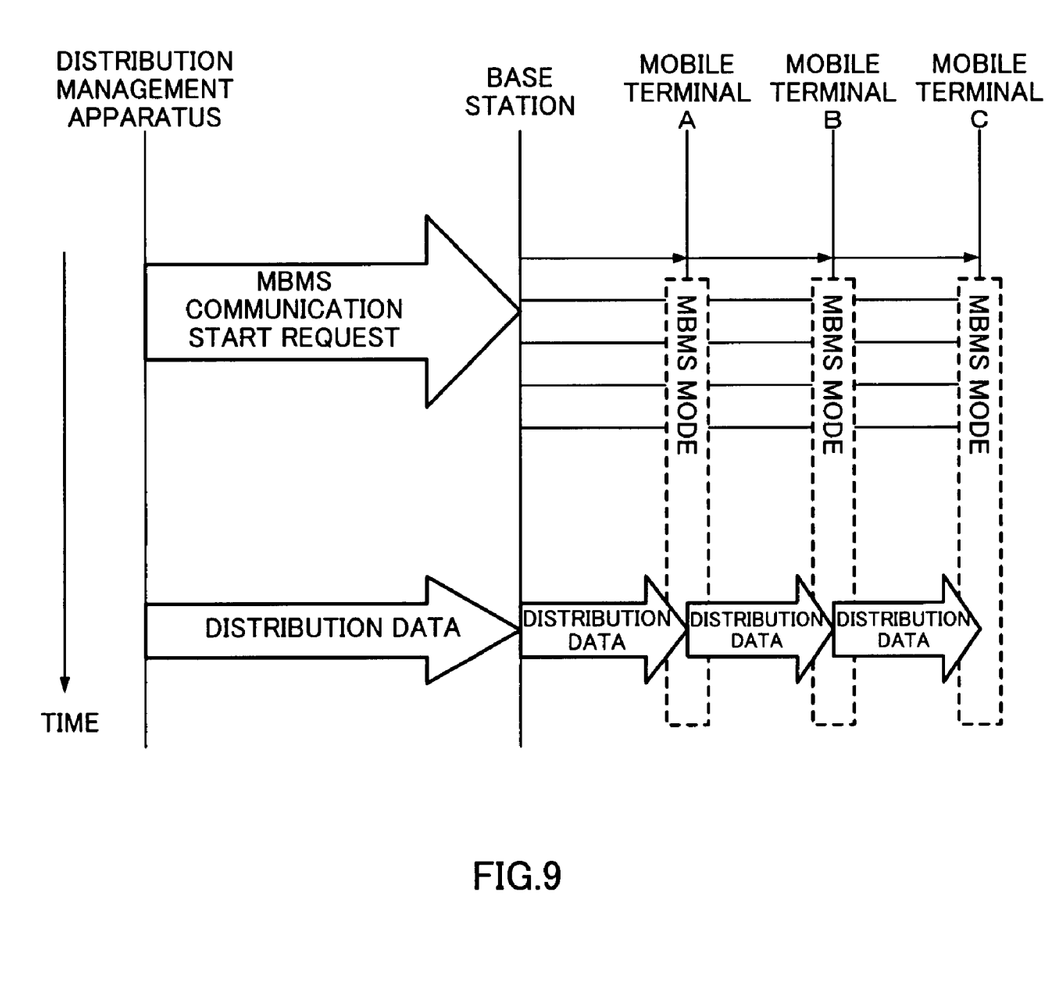
FIG. 9 shows a case of starting up MSMS mode at the same time as an MSMS communication start request.

In FIG. 9, a case is shown schematically where mobile terminal apparatuses start up MBMS communication mode at the same time as an MBMS communication start request is received (i.e. communication mode start-up instruction signal). In this event, when an MBMS communication start request is received, mobile terminal apparatuses forcibly end other application programs to ensure the resources necessary for executing MBMS communication mode.

Figure 10:
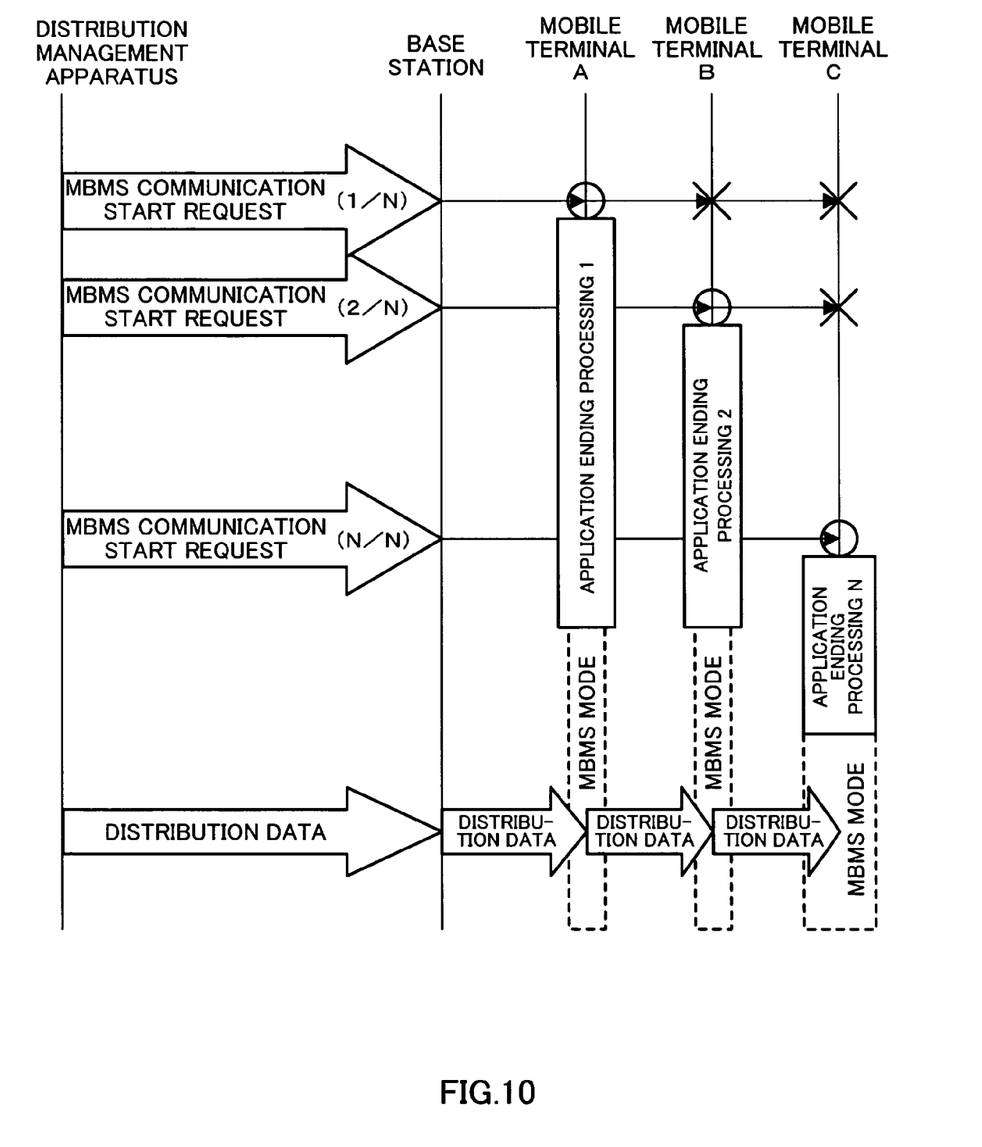
FIG. 10 illustrates an application program ending processing in stages.

In FIG. 10, processing for ending application programs in stages based on a counter value indicating time remaining until distribution in this embodiment is shown schematically. In FIG. 10, it is taken that mobile terminal A only is capable of receiving an MBMS communication start request (1/N) transmitted first, mobile terminal B is capable of receiving MBMS communication start request (2/N) transmitted second, and mobile terminal C is capable of receiving MBMS communication start request (N/N) transmitted last (Nth time).

The time until distribution for mobile terminal A is sufficient so that application ending processing 1 with low forcing is carried out (step S303-1 of FIG. 8), and the processing moves to MBMS communication mode. There is comparatively plenty of time until distribution for mobile terminal B so that application ending processing 2 is carried out (step S303-2 of FIG. 8), and the processing moves to MBMS communication mode. Meanwhile, the time until distribution for mobile terminal C is short so that application ending processing N with the highest forcing is carried out (step S303-N of FIG. 8), and the processing moves to MBMS communication mode.

According to this embodiment, by sending a command indicating the time remaining until distribution on the distribution side and having mobile terminal apparatus 500 carry out application program ending processing in stages according to the time remaining until distribution, stopping other running application programs unnecessarily is not required. Namely, in the event that there is plenty of time until distribution, rather than forcibly stopping an application program, it is possible to stop an application program as a result of a predetermined operation by a user, and, in the event that there is not plenty of time, the program is forcibly stopped so that it is possible to reliably ensure resources necessary for MBMS communication mode while maintaining ease of use for a user.

Embodiment 4

Figure 11:
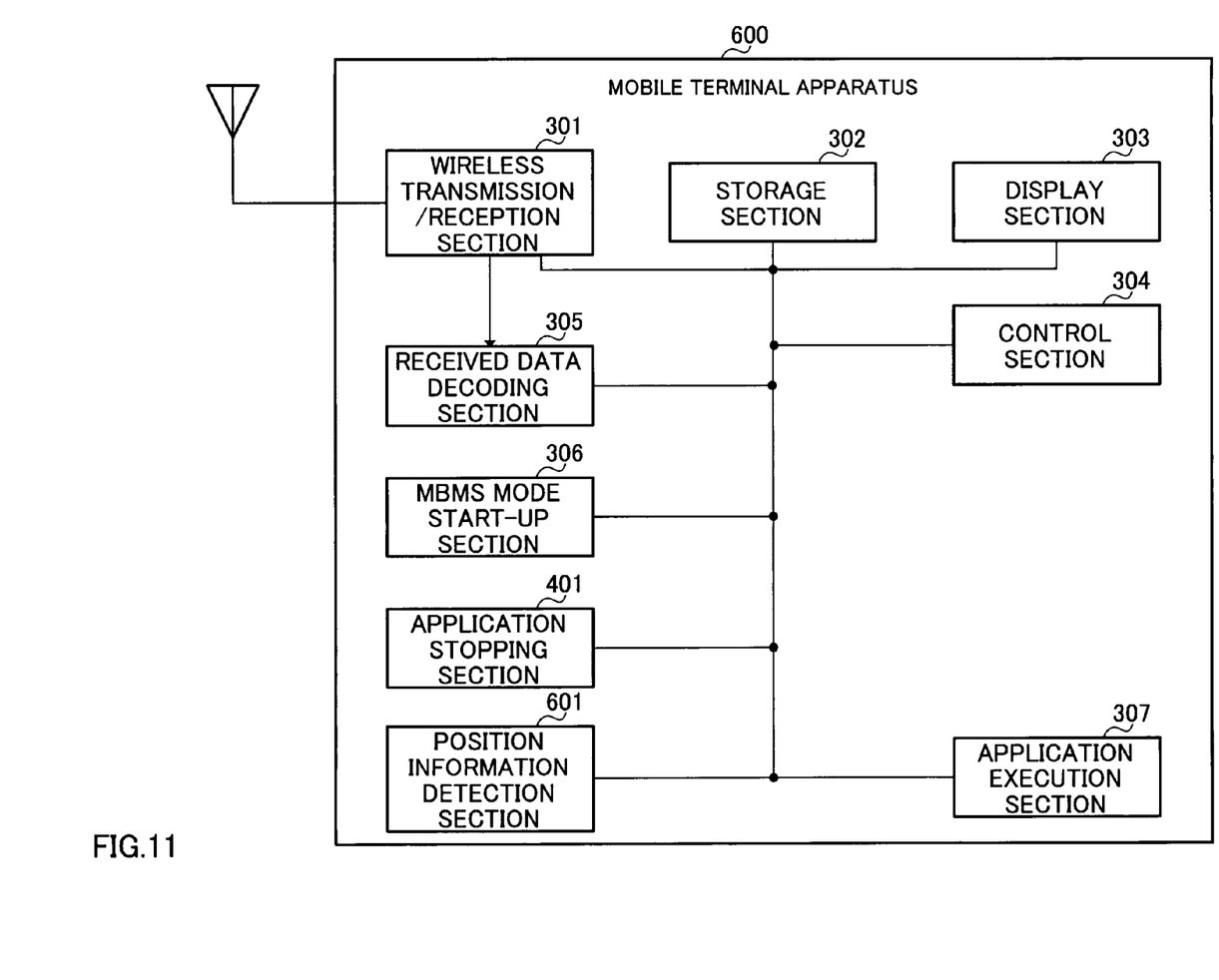
FIG. 11 is a block view showing the configuration of a mobile terminal apparatus of Embodiment 4.

A configuration of a mobile terminal apparatus of this embodiment is shown in FIG. 11, with components corresponding to FIG. 5 being assigned the same numerals. Mobile terminal apparatus 600 differs from mobile terminal apparatus 400 of FIG. 5 in that mobile terminal apparatus 600 has position information detection section 601, and rather than operating based on an MBMS communication mode start-up instruction signal, MBMS mode start-up section 306 and application stopping section 401 operate based on position information detected by position information detection section 601.

Position information detection section 601 detects the position of its own apparatus by using a base station of mobile telephone network 103 or a satellite system, etc. Position information detection section 601 normally detects position information for its own apparatus, and determines whether or not a specific area such as a pre-registered place of a training center or classroom etc. has been entered. Upon detecting that a specific area has been entered by position information detection section 601, mobile terminal apparatus 600 gives notification of the entry to MBMS mode start-up section 306 and application stopping section 401.

MBMS mode start-up section 306 and application stopping section 401 take a detection signal from position information detection section 601 indicating that a specific area has been entered as a trigger in place of the MBMS communication mode start-up instruction signal, and carries out the MBMS communication mode start-up processing and the application program stopping processing described for Embodiments 1 and 2. Namely, it is not necessary to send an MBMS communication mode start-up instruction signal from distribution management apparatus 102 in this embodiment.

Figure 12:
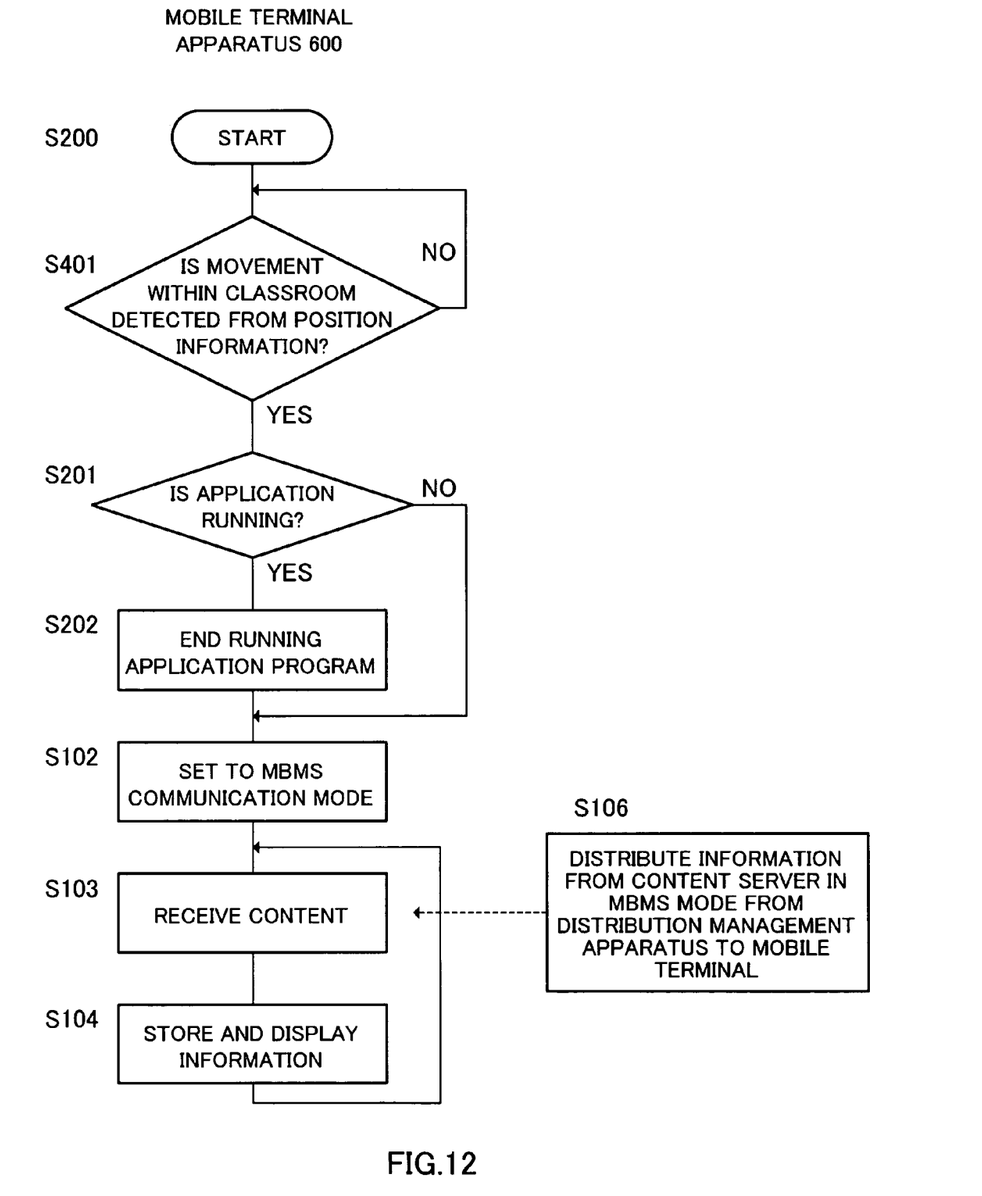
FIG. 12 is a flow chart illustrating the operation of a content distribution system of Embodiment 4.

Next, the operation of a content distribution system of this embodiment is described using FIG. 12. In FIG. 12, the components corresponding to FIG. 6 are assigned the same numerals and description thereof will be omitted. Mobile terminal apparatus 600 of this embodiment carries out processing for detecting whether or not there is movement within a classroom from position information by position information detection section 601 (step S401) in place of the communication mode start-up instruction signal receive confirmation processing (step S101). When it is confirmed from the position information that there is movement within the classroom, in the following, the same processing as when a communication mode start-up instruction signal is received is carried out.

According to this embodiment, position information detection section 601 detecting that a specific area for distribution has been entered is provided, and by carrying out application program stopping processing and MBMS communication mode start-up processing when entry to a specific position is detected, it is possible to automatically switch over to communication mode without performing any operations at mobile terminal apparatus 600 and distribution management apparatus 102, and by stopping other running application programs on mobile terminal apparatus 600, it is possible to lower the occupancy rate of the resources and increase reliability for reception of MBMS communication mode data.

Other Embodiments

Figure 13:
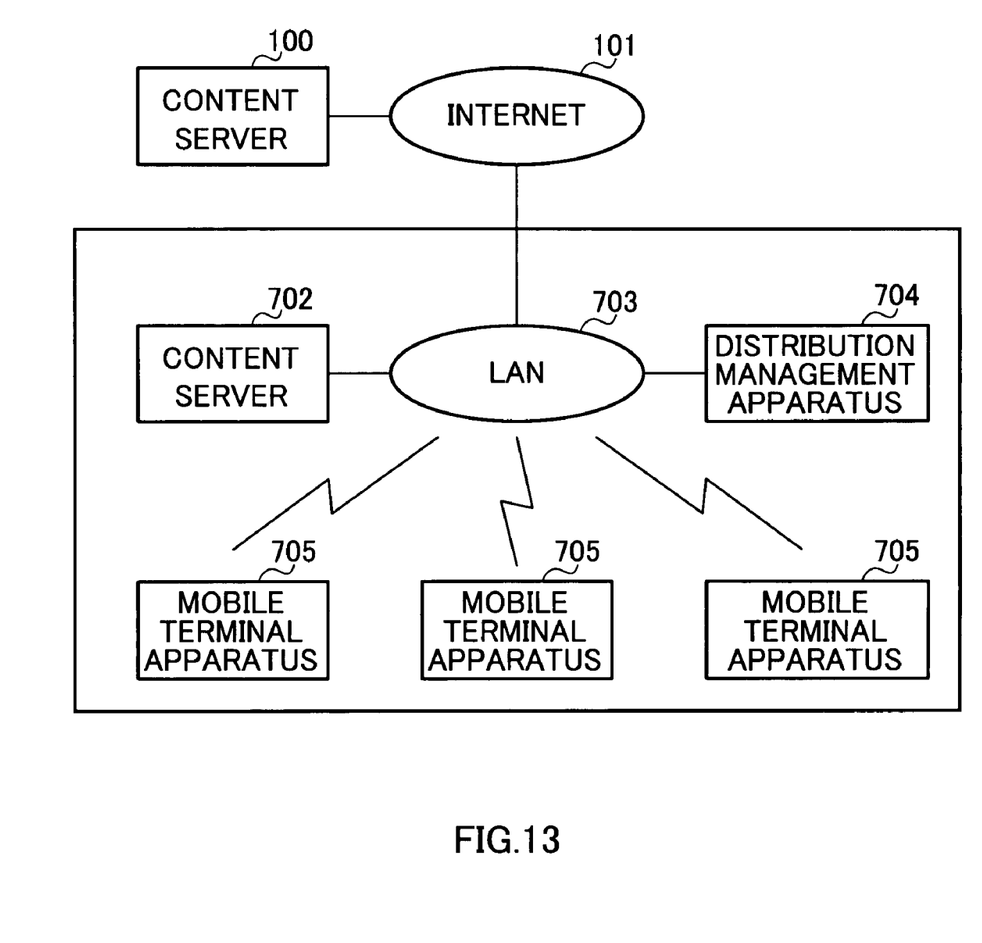
FIG. 13 shows a further example configuration of a content distribution system.

In the above embodiments, a case has been described where the present invention is applied to a content distribution system configured as shown in FIG. 1 but the present invention is not limited to this, and may be applied to the content distribution system of the configuration shown in FIG. 13.

The content distribution system of FIG. 13 has a LAN 703 capable of connecting to via wireless LAN access points and that is connected to Internet 101, mobile terminal apparatus 705 such as a mobile telephone, personal computer, or PDA etc. accessible to a wireless LAN, distribution management apparatus 704, and content server 702 containing various applications. Further, distribution management apparatus 704 is connected to Internet 101, and also capable of collecting information for content server 100 different to content server 702 via Internet 101. As with distribution management apparatus 102 described above, distribution management apparatus 704 simultaneously distributes data to be distributed (content) to mobile terminal apparatuses 705 using multicast communication.

Here, with mobile terminal apparatus 705 using the system shown in FIG. 13, wireless transmission/reception section 301 of FIG. 3, FIG. 5, FIG. 7 and FIG. 11 may operate under a wireless LAN installed at a school or place rather than under a public mobile telephone network. Position information detection section 601 described in Embodiment 4 is also capable of detecting position using a wireless LAN access point. Further, the configuration of distribution management apparatus 704 may be the same as distribution management apparatus 102 of FIG. 2, but may be taken to operate under a wireless LAN connected to Internet 101.

In the embodiments described above, the case has been described where mobile terminal apparatus automatically stops an application program and switches automatically to MBMS communication mode based on a communication mode start-up instruction signal from distribution management apparatus 102 or based on position information, but the timing of the processing for stopping the application and processing for communication mode switching of the present invention is not limited to this. It is also appropriate to use a method where a schedule is registered in advance in a mobile terminal and application stopping processing and communication mode switching processing are carried out automatically when a time is reached, or a method where an application program controlling steps of a course is registered in a terminal and an application stopping processing and communication mode switching processing are carried out automatically at a timing for downloading the next teaching materials according to state of progress of the course and level of understanding.

Further, in the above embodiments, a case has been described where this invention is applied to a system for downloading data using an MBMS communication mode, but the present invention is not limited in this respect, and may be broadly applied to a 1 to N type content distribution system where a handshake is not carried out, i.e. a data download system using multicasting and the same effect can be obtained as the embodiments described above.

This specification is based on Japanese patent application no. 2004-118285, filed on Apr. 13, 2004, the entire content of which is expressively incorporated by reference.

INDUSTRIAL APPLICABILITY

The present invention is appropriate for application to a system for simultaneously distributing content to, for example, mobile terminal apparatus of students in a classroom where an instructor using distribution management apparatus.

The invention claimed is:

1. A content distribution system having a mobile terminal capable of wireless communication, and a distribution management apparatus controlling distribution of content data stored on a content server and distributing the content data to the mobile terminal by wireless, wherein the distribution management apparatus comprises a signal generation section that generates a multicast communication mode start-up instruction signal instructing start-up of a communication mode for downloading data using multicasting to the mobile terminal, and a transmission section that transmits the start-up instruction signal; and the mobile terminal comprises a reception section that receives the start-up instruction signal, a start-up section that starts up a multicast data download communication mode based on the start-up instruction signal, and an application stopping section that stops an application program that is running other than an application program related to the multicast data download communication mode, based on the start-up instruction signal, wherein the mobile terminal is configured to start up the multicast data download communication mode and stop the application program that is running, based on the start-up instruction signal from the distribution management apparatus.

2. The content distribution system according to claim 1, wherein the application stopping section stops the application program when it is determined that sufficient resources are not ensured to start the multicast data download communication mode.

3. The content distribution system according to claim 1, wherein:

the distribution management apparatus generates a signal containing information indicating time remaining until the start of distribution as the start-up instruction signal; and the mobile terminal carries out processing for stopping the application in stages based on the time remaining until the start of distribution.

4. The content distribution system according to claim 3, wherein the mobile terminal comprises a request level counter that increases count value based on the time remaining until the start of distribution, and carries out processing for stopping the application in stages according to a count value of the request level counter.

5. A mobile terminal apparatus having a wireless communication function and receiving content data stored on a content server by wireless, comprising:

a reception section that receives a multicast communication mode start-up instruction signal;

an application stopping section that stops an application program that is running other than an application program related to a multicast data download communication mode, based on the start-up instruction signal; and a start-up section that starts up a multicast data download communication mode after the application program is stopped, wherein the starting-up of the multicast data download communication mode and the stopping of the application program that is running, are carried out based on the start-up instruction signal.

6. The mobile terminal apparatus according to claim 5, further comprising a position detection section that detects whether or not the terminal itself is at a specific position, wherein:

the application stopping section stops the application program that is running when detection results for presence in a specific position are obtained; and the start-up section starts up the multicast data download communication mode when the detection results for presence in a specific position are obtained.

7. A content distribution method comprising:

at a distribution management apparatus, transmitting a start-up instruction signal instructing start-up of a communication mode for data download using multicasting to a mobile terminal;

at the mobile terminal, receiving the start-up instruction signal, stopping an application program that is running other than an application program related to the multicast data download communication mode, and starting up the multicast communication mode;

at the distribution management apparatus, transmitting distribution information; and at the mobile terminal, receiving the distribution information in the multicast communication mode, wherein the mobile terminal is configured to start up the multicast data download communication mode and stop the application program that is running, based on the start-up instruction signal from the distribution management apparatus.

* * * * *